(12) United States Patent
Sameer et al.

(10) Patent No.: US 7,158,778 B2
(45) Date of Patent: Jan. 2, 2007

(54) METHOD FOR VIRTUAL NETWORK CONNECTIVITY FOR POWERED OFF STATIONS IN WIRELESS LAN NETWORKS

(75) Inventors: Kalathil Perazhi Sameer, Bangalore, IN (US); Anil A. Degwekar, Bangalore, IN (US); Sridhar M. Rajagopal, Bangalore, IN (US); Sudhir Tonse, Bangalore, IN (US); Meeta Mishra, Bangalore, IN (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 10/121,952

(22) Filed: Apr. 11, 2002

(65) Prior Publication Data

US 2004/0203609 A1    Oct. 14, 2004

(51) Int. Cl.
*H04M 1/663* (2006.01)
(52) U.S. Cl. .............. 455/412.2; 455/69; 455/574
(58) Field of Classification Search .......... 455/412.1, 455/63.2, 413, 574; 370/255, 312, 331, 338
See application file for complete search history.

(56) References Cited

U.S. PATENT DOCUMENTS

| 5,504,804 | A | * | 4/1996 | Widmark et al. | ........... 455/63.2 |
| 5,570,366 | A | * | 10/1996 | Baker et al. | ........... 370/312 |
| 5,654,959 | A | * | 8/1997 | Baker et al. | ........... 370/331 |
| 5,991,287 | A | * | 11/1999 | Diepstraten et al. | ........ 370/338 |
| 6,091,947 | A | * | 7/2000 | Sumner | ............. 455/413 |
| 6,463,307 | B1 | * | 10/2002 | Larsson et al. | ............. 455/574 |
| 6,507,735 | B1 | * | 1/2003 | Baker et al. | ............ 455/412.1 |
| 6,687,504 | B1 | * | 2/2004 | Raith | .............. 455/456.1 |
| 2002/0019215 | A1 | * | 2/2002 | Romans | ............. 455/574 |
| 2003/0103451 | A1 | * | 6/2003 | Lutgen et al. | ............. 370/229 |

OTHER PUBLICATIONS

Duerk et al., Switching to voice mail in the event of a dropped call, Jul. 17, 2003.*
Diepstraten, W., "Distributed Access WMAC Synchronization and Power Management Mechanisms", IEEE (online), retrieved Jul. 2003 from http://grouper.ieee.org/groups/802/11/Documents/DocumentArchives/1993_docs/, Jul. 1993.
"IEEE standard Part 11: wireless LAN medium access control (MAC) and physical layer (PHY) specifications", ISO/IEC 8802-11, ANSI/IEEE Std. 802.11 (1999).
Diepstraten, W., "The provisions required for handoff", IEEE (online), retrieved Jul. 2003 from http://grouper.ieee.org/groups/802/11/Documents/ DocumentArchives/1993_docs/, Jan. 1994.
IEEE Std 802.11 First edition (Dec. 15, 1999), entitled "Information technology—Telecommunications and information exchange between systems—Local and metropolitan area networks—Specific requirements—Part 11".

* cited by examiner

*Primary Examiner*—Gerald Gauthier
(74) *Attorney, Agent, or Firm*—Fish & Richardson P.C.

(57) ABSTRACT

An access point in a wireless network is connected to wireless devices. When any of the devices becomes inaccessible, the device sends a notification to the access point to indicate the inaccessibility. The access point then receives and stores incoming messages that are destined for the device. The access point forwards the messages to the device when the device is ready to receive the message.

12 Claims, 2 Drawing Sheets

METHOD FOR VIRTUAL NETWORK CONNECTIVITY FOR POWERED OFF STATIONS IN WIRELESS LAN NETWORKS

BACKGROUND

Wireless Local Area Networks (LAN) have become a popular alternative to wired LANs, especially at locations where wiring is difficult or costly. For example, a warehouse or a hospital that was not built to include a wiring infrastructure for the LAN may have great difficulties to accommodate a wired network. The cost for adding the wiring infrastructure into such a building may be prohibitively higher than deploying a wireless LAN.

Stations or devices in a wireless LAN may communicate with each other directly over wireless channels, or indirectly through a wireless Access Point (AP). A wireless AP may act as a hub to provide connectivity for the devices associated with the AP, or may serve as a bridge to connect a wireless LAN to a variety of wired networks, e.g., Ethernet and Token Ring networks. A number of wireless APs may be interconnected to provide an extensive coverage area for a wireless LAN.

There are several approaches to implementing an AP. An AP may be implemented as an embedded hardware product, or as a software product that may be run on a general-purpose computer. The APs that are implemented in software may be called soft APs.

One widely-accepted industry standard for wireless LANs is the IEEE 802.11 standard published in 1997. The IEEE 802.11 standard specifies that a device in a wireless LAN enter a power-saving state after being inactive for a pre-determined period of time. The device may periodically wake up from the power-saving state to receive beacon signals from the AP with which the device is associated. The beacon signals may indicate whether there are messages waiting for the device at the AP.

DETAILED DESCRIPTION

Figure 1:
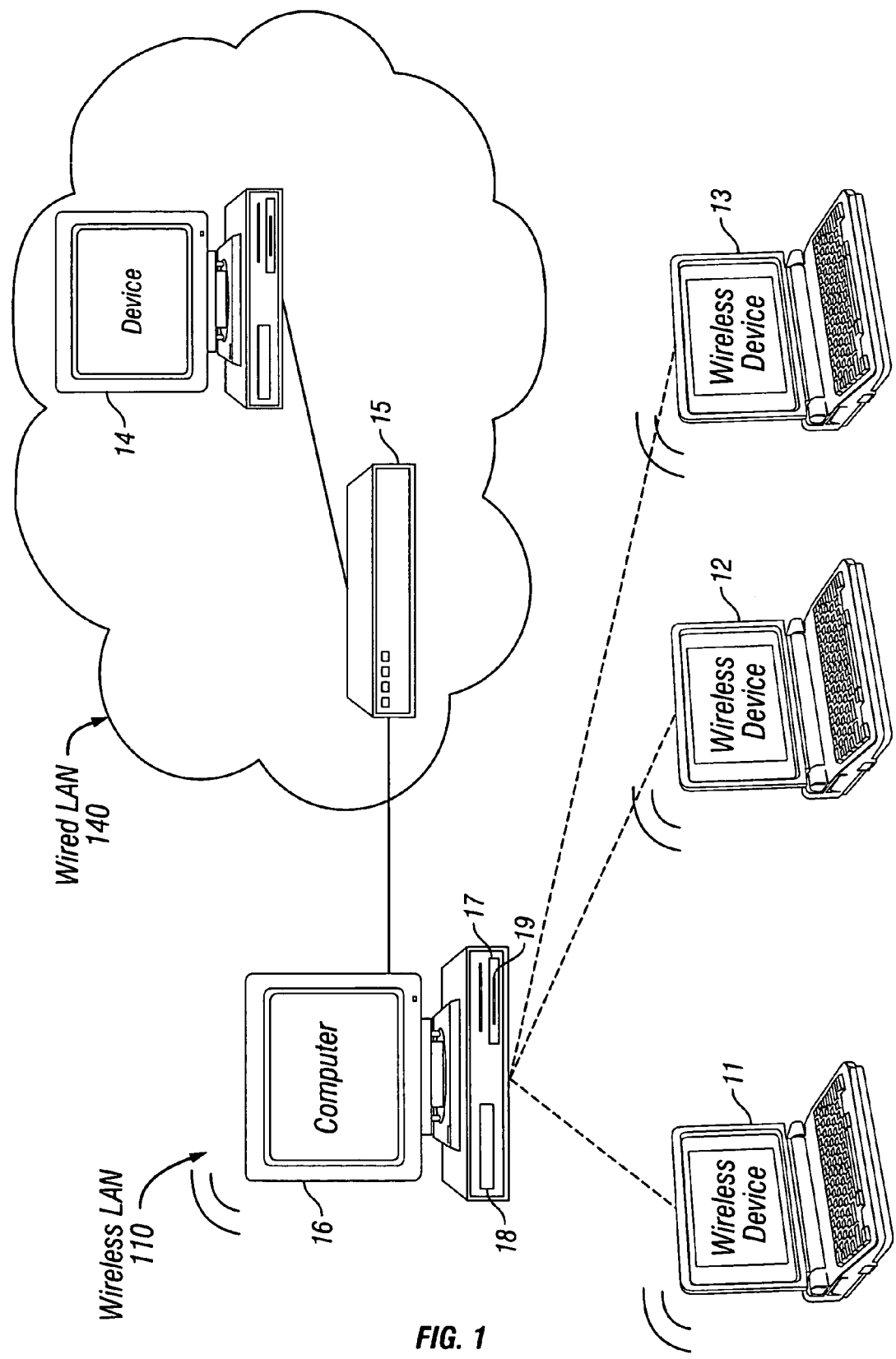
FIG. 1 illustrates an embodiment of a system including an AP according to the present disclosure.

FIG. 1 shows an embodiment of a wireless LAN 110 including wireless devices 11, 12, and 13, that may be connected to a computer 16 on which a wireless AP 19 is installed. In this embodiment, the AP 19 may be implemented as a soft AP that resides on a computer-readable medium 17 accessible by the computer 16. Alternatively, the AP 19 may be implemented as an embedded hardware device. The devices 11, 12, and 13 may be computers or mobile stations with wireless LAN cards, and may communicate with each other through the AP 19 over wireless channels.

The wireless network 110 may be connected to a wired network 140 through the AP 19. The AP 19, in this embodiment, serves as a bridge between the two networks 110 and 140, performing appropriate address and format translations. Although only one device 14 is shown in the wired network 140, a plurality of devices may be included in the wired network 140, connecting to a hub 15. Through the AP 19 and the hub 15, the devices 11, 12, and 13 may communicate with any of the devices in the wired network 140.

When the AP 19 receives a message destined for a device in the wireless LAN 110, e.g., the device 11, the AP 19 may send a beacon signal notifying the device 11 of the incoming message. If the device 11 is accessible and ready to receive the message, the AP 19 forwards the message to the device 11. Otherwise, the AP 19 may hold the message until the device 11 is ready to receive the message.

If the device 11 temporarily leaves the wireless network 110, the AP 19 may hold the messages addressed to the device 11, thereby maintaining a virtual connectivity for the device 11. This may happen, for example, when the device 11 goes into an inactive mode, e.g., a power down mode or a hibernate mode, or when the device 11 roams beyond the communication range of the AP 19. Before the device 11 leaves the network 110, the device 11 may notify the AP 19 of the inaccessibility. Once the AP 19 receives this notification, the AP holds all the incoming messages addressed to the device 11 until the device 11 becomes accessible and ready to receive messages again, although the scope of the invention is not limited in this respect.

If the device 11 leaves the wireless network 110 due to a sudden loss of connection to the AP 19, the device 11 may not be able to notify the AP 19 prior to losing the connection. In this scenario, when the AP receives a message addressed to the device 11, the AP 19 may attempt to deliver the message by querying whether the device 11 is ready to receive messages. The AP 19 waits for a pre-determined period of time but no response from the device 11 is detected. The AP 19 may then determine that the device 11 has become inaccessible and start holding messages for the device 11.

When the device 11 is inaccessible, the incoming messages bound for the device may be held in storage media 18, e.g., memory or hard disks, which is accessible by the AP 19. The storage media 18 may reside locally in computer 16, as shown in FIG. 1, or reside in a remote location. The size of the storage media 18 allocated to store the messages can be determined based on the following factors including, but not limited to, the number of devices connected to the wireless LAN 110, and the duration of time for which the AP 19 holds the messages. To avoid these messages from overflowing the allocated space, the AP 19 may discard some of the messages, such as the messages that have stayed in the storage media 18 longer than an age limit, to make room for the more recent messages.

After the device 11 returns to the wireless network 110, the device 11 sends an "I am back" message to the AP 19 to indicate the accessibility. The AP 19 then sends a beacon signal to determine whether the device 11 is ready to receive messages. If the device 11 is ready, the AP 19 forwards all the messages addressed to the device 11 that are held in the storage media 18 to the device 11. Otherwise, the AP 19 continues to hold the messages until the device 11 is ready or the age limit for holding the messages is exceeded.

It the AP 19 is implemented as a soft AP, the capacity of the AP 19 for holding messages may be increased without significant increase in cost. For example, the capacity can be increased by adding more hard disks to the computer 16.

In contrast to the standard specified by the IEEE 802.11, the device 11 is not required to wake up periodically to receive beacon signals from the AP 19. Rather, the device 11 only sends a signal to the AP 19 before it goes off-line, and sends another signal to the AP 19 after the device become accessible again. This allows the device 11 to save a significant amount of power compared to a device implementing the IEEE 802.11 standard.

Figure 2:
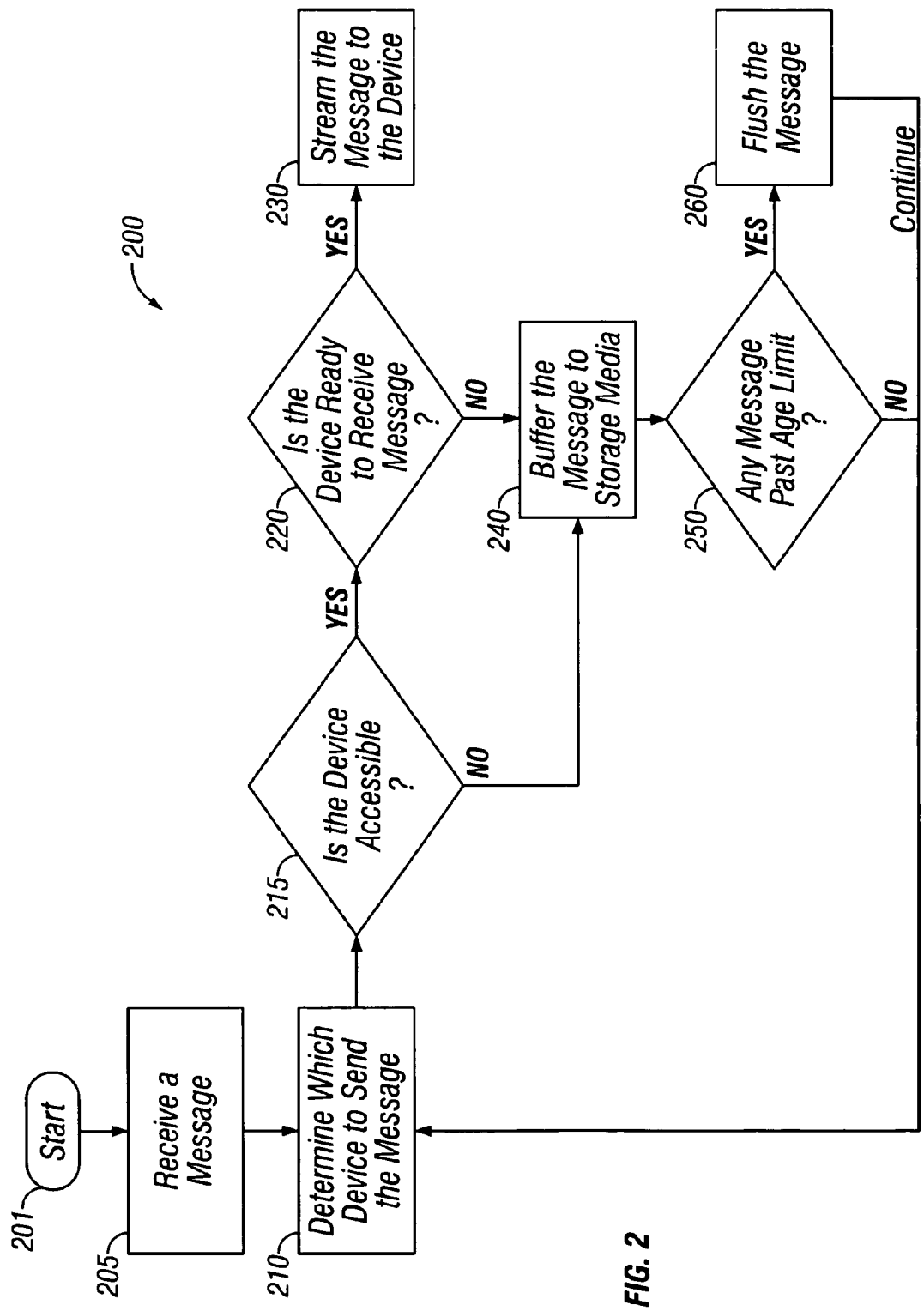
FIG. 2 illustrates a flow diagram of a message-managing process carried out by the AP.

FIG. 2 illustrates a message-managing process 20 carried out by the AP 19. The process 200 determines when to hold a message for an associated device and when to forward the message to the device. The process 200 begins at a start state 201. Proceeding to state 205, the AP 19 receives a message. The message includes an address field, which has a destination address indicating to which device the message should be forwarded. Proceeding to state 210, the AP 19 determines which device to send the message based on the destination address. Here, assume the message is addressed to the device 11.

Proceeding to state 215, the AP 19 determines if the device 11 is accessible. The AP 19 keeps status information for the associated devices in a memory location. Once the AP 19 detects, or is notified of, a device's inaccessible status, the AP 19 stores the status information in the memory location until the device 11 notifies the AP 19 of a change of status. If the device 11 is accessible, the process 200 proceeds along the YES branch to state 220 to further determine if the device 11 is ready to receive messages. If the device 11 is not accessible, the process 200 proceeds along the NO branch to state 240 to buffer the message to the storage media 18.

In state 220, if the device 11 is ready to receive messages, the process 200 proceeds along the YES branch to state 230 to stream the message to the device 11. If the device 11 is not ready to receive any messages, the process 200 proceeds along the NO branch to state 240 to buffer the message to the storage media 18.

After the AP 19 buffers the message to the storage media 18, the process 200 proceeds to state 250. In state 250, the AP 19 determines if any message in the storage media 18 has passed the age limit for holding the messages. If the AP 19 finds a message that has passed the age limit, the process 200 proceeds along the YES branch to state 260. The message is discarded from the storage media 18, and the process 200 returns to state 210. If the AP 19 does not find a message that has passed the age limit, the process 200 proceeds along the NO branch back to state 210. The AP 19 then continues to process the next received message.

The process 200 may be used for devices that typically do not roam between different APs, but remain associated with a single AP. By carrying out the process 200, the AP 19 enables a virtual connectivity for devices associated with the AP 19 by forwarding and holding messages for the devices at appropriate times. Thus, the devices can be turned off for a prolonged time period without losing connectivity to other devices in the network. This allows power-limited devices, e.g., cellular phones or Personal Digital Assistants (PDAs), to preserve battery power.

Devices that are less limited by battery power, e.g., in-home devices, can also benefit from the present disclosure. For example, a device may not wish to be interrupted while engaging in a computing task. During the time when the device is busy, the AP 19 may treat the device as inaccessible. The AP 19 may hold the messages addressed to the device until the device completes the tasks. The AP 19 may then forward the messages in a batch to the device.

Other embodiments are within the scope of the following claims.

What is claimed is:

1. A method comprising:
   receiving, at an access point on a wireless network, a first notification from a device on the wireless network that the device is to be in an inaccessible power-saving state;
   receiving, the access point, at least one message addressed to the device subsequent to the receipt of the first notification;
   storing, by the access point, the at least one message in storage media until a second notification from the device that the device is out of the power-saving state is received;
   receiving, at the access point, the second notification from the device; and
   forwarding, by the access point, the stored at least one message to the device if the device is accessible and ready to receive messages in response to the receipt of the second notification.

2. A method as in claim 1, wherein:
   the wireless network is a local area network; and
   the at least one message is at least one data message on the local area network including an address.

3. A method as in claim 1, further comprising:
   discarding the at least one message if the at least one message has been stored in the storage media longer than an age limit.

4. A method as in claim 1, further comprising receiving, storing, and forwarding multiple messages.

5. A system comprising:
   storage media;
   an access point that is coupled to a plurality of devices over a local area wireless network, the access point being operable to:
   receive a first notification from a first device on the local area wireless network that the first device is to enter a power-saving state and become inaccessible to the access point;
   receive at least one message addressed to the first device subsequent to the receipt of the first notification;
   store the at least one message in the storage media until a second notification from the device that the device is out of the power-saving state is received;
   receive the second notification from the first device;
   forward the stored at least one message to the device if the device is accessible and ready to receive messages; and
   the local area wireless network to connect the access point to the first device based on a network address within the at least one message.

6. A system as in claim 5, wherein the access point is a software application executable by a computer.

7. A system as in claim 5, further comprising:
   a memory location accessible by the access point, the memory location keeping a status of accessibility for the device.

8. A system as in claim 5, wherein the size of the storage media allocated to the access point is adjustable based on a number of devices connected to the access point.

9. A system as in claim 5, wherein the access point discards the stored at least one message if the stored at least one message has been stored in the storage media longer than the time period.

10. A computer program product residing on a computer-readable medium comprising instructions for causing the computer to:
    receive, at an access point on a wireless network, a first notification from a device on the network that the device is to enter a power-saving state and become inaccessible to the access point;
    receive, by the access point, at least one message addressed to the device subsequent to the receipt of the first notification;

store, by the access point, the at least one message in storage media until a second notification from the device that the device is out of the power-saving state is received;

receive, at the access point, the second notification from the device; and forward, by the access point, the stored at least one message to the device if the device is accessible and ready to receive messages in response to the receipt of the second notification.

11. A computer program product as in claim 10, wherein:
the network is a local area network; and
the at least one message is at least one data message on the local area network including an address.

12. A computer program product as in claim 10, further comprising instructions for causing the computer to:
discard the at least one message if the at least one message has been stored in the storage media longer than an age limit.

* * * * *